United States Patent [19]

Newbauer et al.

[11] 4,286,547
[45] Sep. 1, 1981

[54] ANIMAL RESTRAINT UNIT

[76] Inventors: Robert E. Neubauer, 1032 N. Bend Rd., Cincinnati, Ohio 45224; Gunther B. Niemann, 1136 Hampstead Rd., Cincinnati, Ohio 45231

[21] Appl. No.: 116,294

[22] Filed: Jan. 28, 1980

[51] Int. Cl.³ .............................................. A01K 15/04
[52] U.S. Cl. ...................................................... 119/96
[58] Field of Search .................... 119/96, 98, 101, 106, 119/126, 129; 54/71, 87, 84, 23, 4; 85/80

[56] References Cited

U.S. PATENT DOCUMENTS

| 2,313,833 | 3/1943 | Marmet | 119/96 |
| 2,649,884 | 8/1953 | Westover | 85/80 |
| 3,994,264 | 11/1976 | Flynt | 119/126 |

FOREIGN PATENT DOCUMENTS 1059761  2/1967  United Kingdom ........................ 85/80

*Primary Examiner*—Gene Mancene
*Assistant Examiner*—Robert P. Swiatek
*Attorney, Agent, or Firm*—Frost & Jacobs

[57] ABSTRACT

An animal restraint unit adapted to be worn by the animal and, in its simplest form, comprising a collar, a waistband and a pair of elonaged, rectilinear, lateral pieces pivotally and releasably connected at substantially diametric positions to the collar and to the waistband and adapted to extend therebetween along the animal's sides. The collar and waistband, together with the attachment thereto of the lateral pieces, are adjustable to properly fit the animal. The restraint unit prohibits the animal from twisting its body laterally, thus preventing the animal from traumatizing posterior portions of its body which have undergone surgery or are inflicted which a dermatological problem. Similarly, the restraint unit prevents the animal from scratching anterior portions of its body. The restraint unit may be provided with a mandible engaging attachment to restrict lowering of the animal's head so as to prevent injury after ophthalmic surgery. The restraint may also have a thoracic attachment mounted thereon prohibiting raising of the front legs so as to prevent pawing of the head area and/or jumping. The restraint unit can additionally be used as an aid in training the animal.

6 Claims, 12 Drawing Figures

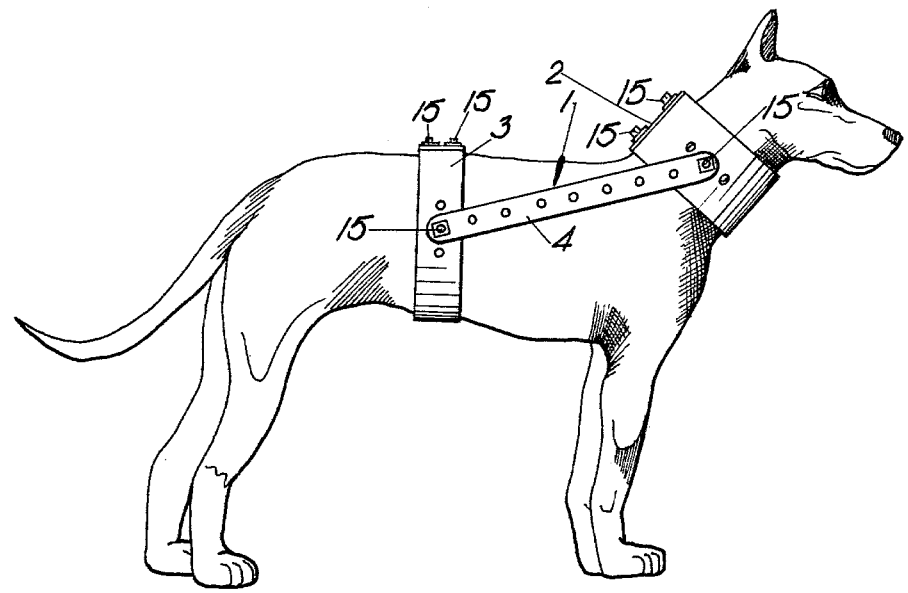
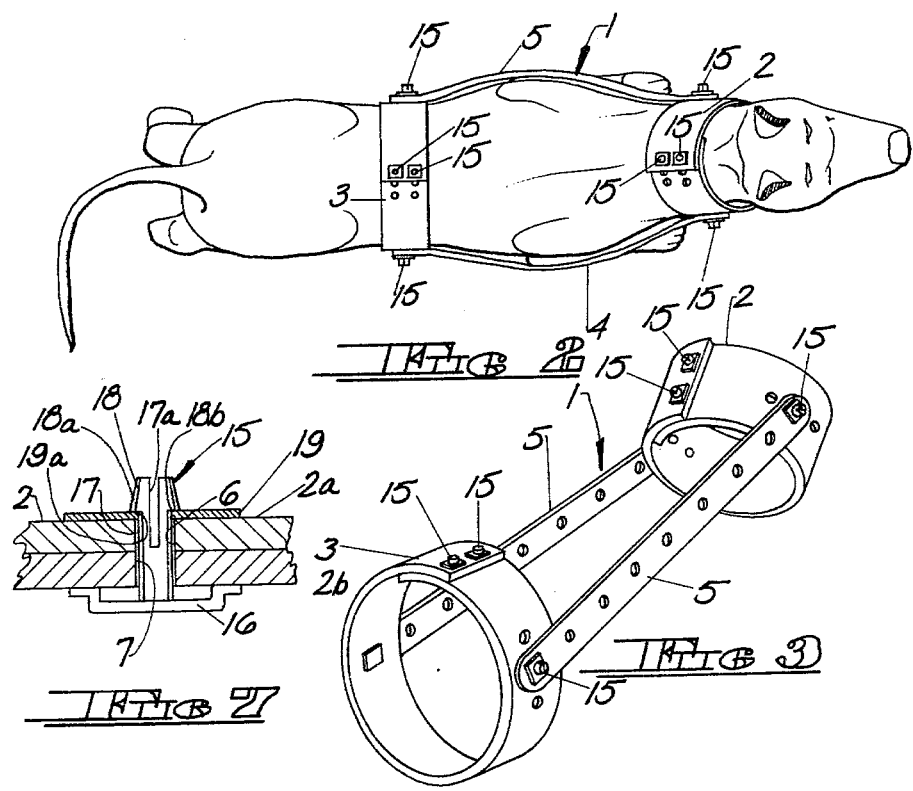

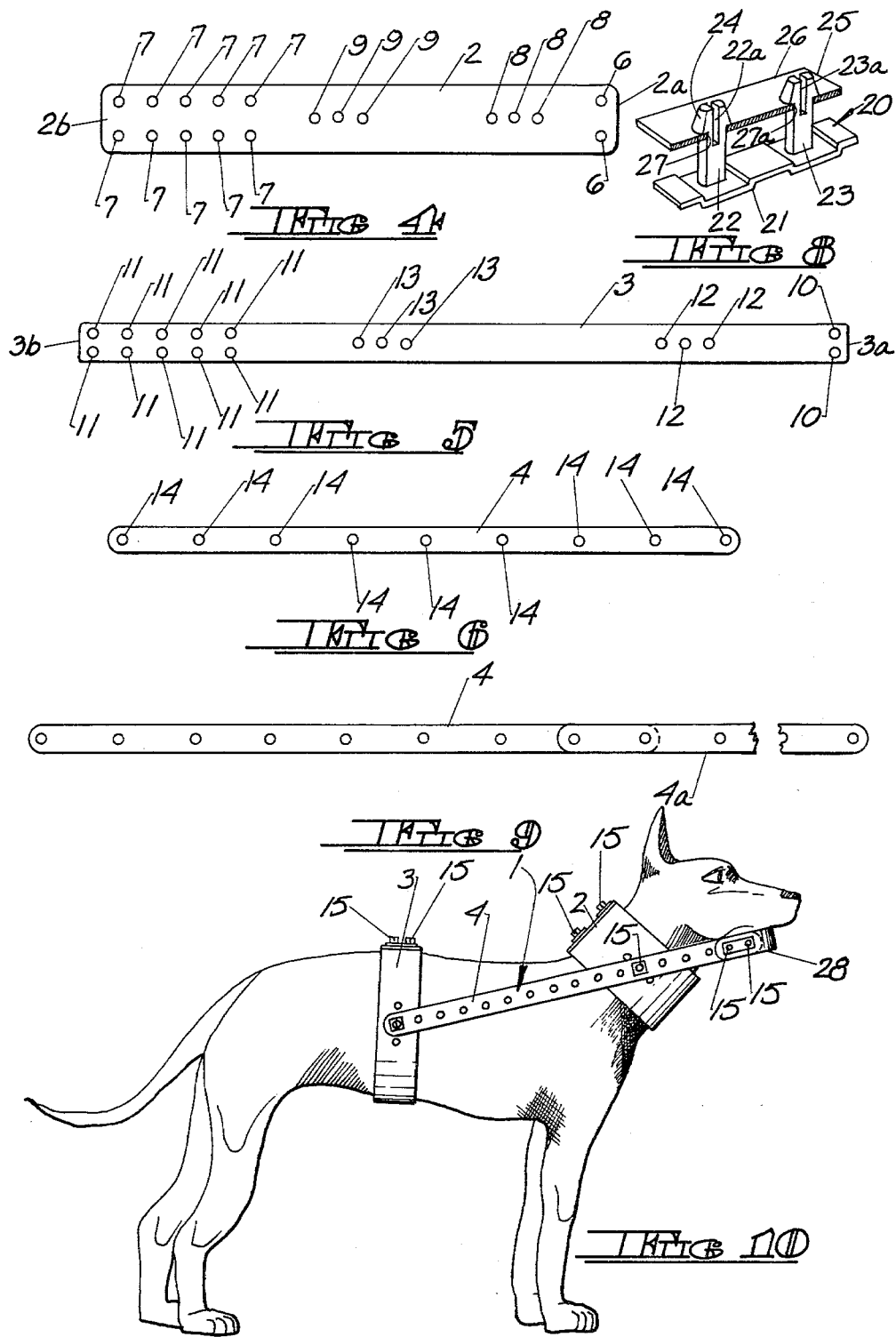

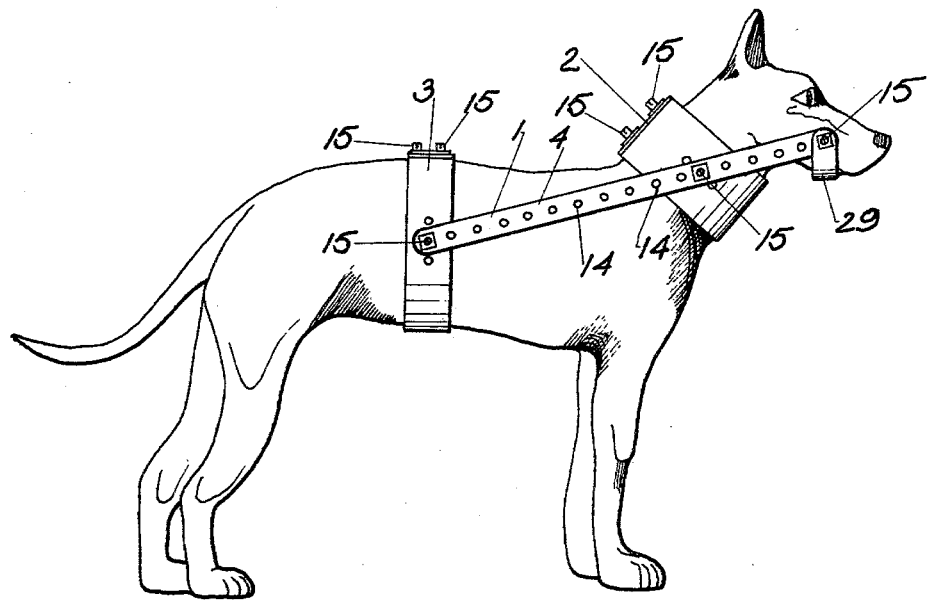
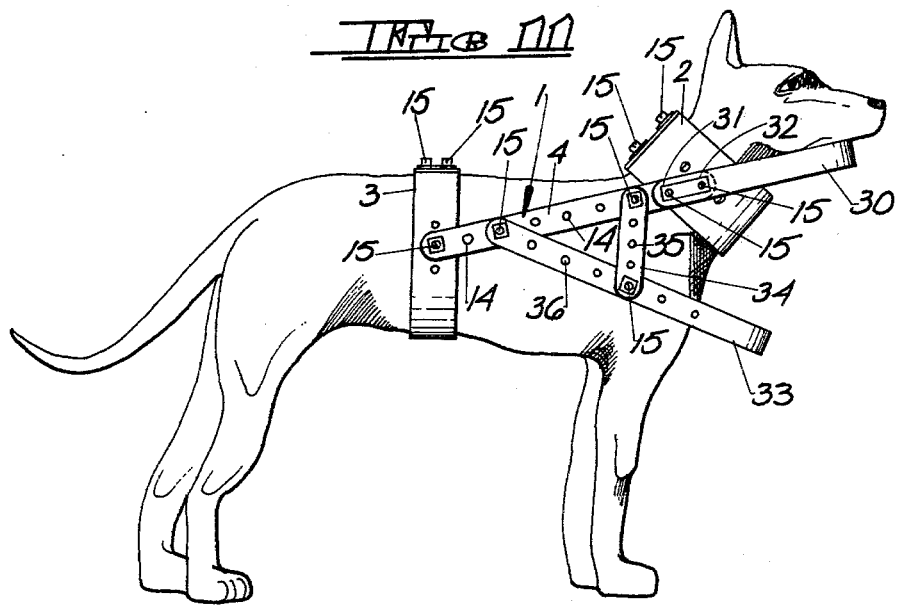

ANIMAL RESTRAINT UNIT

TECHNICAL FIELD

The invention relates to an animal restraint, and more particularly to such a restraint which will prevent traumatizing by the animal of posterior and anterior parts of its body and which may also be used as a training aid.

BACKGROUND ART

While the invention is not intended to be so limited, it will, for purposes of an exemplary showing, be described in its application to dogs, for which it is particularly suited.

A major difficulty in the treatment of dogs or other animals afflicated with dermatological problems or after surgery or the like is the traumatizing of the affected area by the animal itself through pawing, licking or biting. Not only is the affected area traumatized in this manner, but also medicaments and/or bandages can be removed in this manner. Workers in the art have long been plagued with the problem of preventing such action by the animal without completely immobilizing the animal; subjecting the animal to undue discomfort; or interfering with normal functions of the animal such as eating, sleeping and the like.

Prior art workers have devised various types of restraint means for various types of animals and for a wide variety of purposes. U.S. Pat. Nos. 439,598; 934,651 and 2,313,833 describe restraint devices for restricting movement of an animal's neck or head.

U.S. Pat. No. 2,026,383 teaches an exemplary form of dog harness made up of body, chest and back straps, but not intended to be a restraint within the meaning of the present invention. U.S. Pat. No. 2,826,172, on the other hand, relates to a similar dog harness provided with a loin choke activated by the animal itself should the animal apply undue pulling force to a leash attached to the restraining dog harness.

U.S. Pat. No. 3,036,554 teaches a device for protecting animals against self-inflicted injury by chewing or biting. The device is of the shape of a truncated cone and is intended to be located about the animals neck with the base of the cone extending forwardly. The device is intended to be made of plastic, rubber or similar material. Such a device, however, is exemplary of those which are uncomfortable for the animal and interfere with eating, sleeping and the like. The animal is also free to work at the device with his hind paws which may result in its ultimate removal.

U.S. Pat. No. 4,036,179 illustrates an animal protector comprising a large U-shaped padded member adapted to extend about the front of the animal's chest and along its sides. The device is held in place by Velcro tape or other suitable strap means. The device not only serves to prevent an animal from reaching parts of its body, but also as a cushioning device for the animal in a cage or while in a vehicle. Once again, however, such a device is bulky and cumbersome.

The present invention is directed to an animal restraint which is very simple in construction and completely adjustable so as to properly fit the animal. It will prevent the animal from traumatizing posterior or anterior portions of its body suffering from a dermatological problem or after a surgical procedure. The device is compact, nonbulky and comfortable for the animal and will not interfere with normal functions such as sleeping, eating or the like. Various attachments may be applied to the basic structure for specific purposes, as will be described hereinafter, and the device may also be used as a training aid.

DISCLOSURE OF THE INVENTION

In accordance with the invention there is provided an animal restraint unit of the type to be worn by the animal. The restraint unit comprises a collar, a waistband and a pair of elongated, rectilinear, lateral pieces pivotally and releasable connected at substantially diametric positions on the collar and waistband. The lateral pieces extend between the collar and waistband along the animals sides.

The lateral pieces are of such length that the restraint unit prohibits the animal from twisting its body laterally. This, in turn, prevents the animal from traumatizing posterior portions of its body by licking, chewing or biting. At the same time, traumatization of the anterior portion of its body by pawing or scratching with its hind paws is similarly prevented. Furthermore, medicaments and/or bandages applied to the posterior or anterior portions of its body cannot be removed by the animal and areas afflicted with dermatological problems or having wounds or surgical incisions will undergo the natural healing processes relatively unmolested.

The restraint unit may be provided with a mandible engaging attachment to restrict lowering of the animal's head so as to prevent injury to eyes or surrounding area after ophthalmic surgery. A thoracic attachment may also be mounted on the restraint unit prohibiting the raising of the front legs. This serves to prevent pawing or scratching of the head area. This device may also serve to prevent jumping.

Finally, the restraint unit of the present invention may be used for training purposes. The thoracic attachment will prevent fence jumping and the like, and the unit itself may be used to better control an unruly animal.

BRIEF DESCRIPTION OF THE DRAWINGS

FIG. 1 is a side elevational view of the restraint unit of the present invention shown mounted on a dog.

FIG. 2 is a top plan view of the restraint unit of FIG. 1.

FIG. 3 is a perspective view of the restraint unit of FIGS. 1 and 2.

FIG. 4 is an elevational view of the collar of the present invention.

FIG. 5 is an elevational view of the waistband of the present invention.

FIG. 6 is an elevational view of a lateral piece of the present invention.

FIG. 7 is a fragmentary elevational view of a pair of lateral pieces joined together to make an extended lateral piece.

FIGS. 8 and 9 are elevational views of exemplary clips or fastening means by which the restraint unit of the present invention is assembled.

FIG. 10 is a side elevational view, similar to FIG. 1, and illustrating another embodiment of restraint unit of the present invention provided with a mandible engaging member.

FIG. 11 is a side elevational view, similar to FIG. 10, and illustrating yet another form of mandible engaging member.

FIG. 12 is a side elevational view of the restraint unit of FIG. 1 provided with both a mandible engaging attachment and a thoracic attachment.

BEST MODE OF CARRYING OUT THE INVENTION

The restraint unit of the present invention, in its simplest form, is illustrated in FIGS. 1 through 3 wherein like parts have been given like index numerals. In FIGS. 1 and 2 the restraint unit (generally indicated at 1) is illustrated mounted on a dog. In FIG. 3, the restraint unit is shown alone in perspective.

In its simplest form, the restraint unit comprises four basic parts. The first part is a collar 2 adapted to extend about the animals neck. The second part is a waistband 3 adapted to fit snugly, but comfortably, about the animal's waist, just behind the rib cage.

The third and fourth parts of the animal restraint comprise elongated, rectilinear, lateral pieces 4 and 5 which may be identical. Lateral pieces 4 and 5 connect the collar 2 to the waistband 3 and are pivotally affixed to the collar 2 and waistband 3 at diametrically opposed positions thereon. As is shown most clearly in FIGS. 1 and 2, those portions of lateral pieces 4 and 5 extending between collar 2 and waistband 3 are of such length that, when the animal's spine is straight, the lateral pieces will lie along the animals's sides comfortably, but without any marked amount of slack. This is important, as will be evident hereinafter.

An exemplary form of collar 2 is illustrated in FIG. 4. The collar may be made of any appropriate material including plastic, leather or the like. Excellent results have been achieved when the collar 2 was made of polyvinylchloride. While the collar 2 may be held about the animal's neck in any suitable fashion including the use of a typical buckle assembly, it is preferred that the ends of the collar be joined by releasable fastening means to be described hereinafter. To this end, the collar 2 at its end 2a is provided with a pair of perforations 6. At its end 2b, the collar is provided with a series of cooperating pairs of perforations 7. To apply the collar to the animal, the collar is located about the animals neck and the end 2a is caused to overlap the end 2b with the pair of holes 6 in alignment with an appropriate one of the pairs of holes 7 for receipt of a releasable fastening means. The collar 2 is also provided with a first group of three perforations 8 and a second group of three perforations 9. These perforations are so located on the collar as to lie substantially along its long axis and as to be substantially diametrically opposed when the collar is mounted on the animal. A selected one of the holes 8 and a selected one of the holes 9 are adapted to receive a releasable fastener for mounting lateral pieces 4 and 5 on the collar. The collar should be of such width that it supports the animals's neck with a minimum of anterior-posterior movement therealong.

FIG. 5 illustrates an exemplary form of waistband 3. Again, the waistband may be adjustably mounted on the animal through the use of ordinary buckle means or the like. Preferably, however, the waistband is attached by fastening means in the same manner described with respect to the collar 2. As a result, the end 3a of waistband 3 is provided with a pair of perforations 10 equivalent to collar perforations 6. The end 3b of collar 3 is provided with a series of pairs of perforations 11 equivalent to collar perforations 7. When the waistband is applied to the animal, the end 3a is caused to overlap the end 3b until the pair of holes 10 is in alignment with a proper one of the pair of holes 11 for receipt of a fastening means.

The waistband 3 is also provided with a first series of perforations 12 and a second series of perforations 13 equivalent, respectively, to collar perforations 8 and 9 and intended to enable the fastening of lateral pieces 4 and 5 to the waistband in the same manner described with respect to collar 2. The waistband 3 may be made of any suitable material such as leather, plastic, nylon or the like.

FIG. 6 illustrates an exemplary lateral piece. While FIG. 6 illustrates lateral piece 4, it will be understood that lateral piece 5 may be identical. The lateral piece 4 constitutes an elongated, rectilinear member having a series of perforations 14 evenly spaced along its length to enable it to be adjustably attached to collar 2 and waistband 3 by means of a releasable fastening member. The perforations 14 also enable the fastening of attachment means to the lateral member as will be described hereinafter.

The lateral pieces 4 and 5 can be made of any appropriate material of sufficient strength to prevent the animal from twisting laterally, while being sufficiently flexible as to cause little or no irritation to the sides and shoulder areas of the animal. Excellent results have been achieved, for example, with lateral pieces made of nylon or polyurethane.

FIG. 7 illustrates an exemplary form of removable fastener for use in assembling the parts of the restraint unit of the present invention. The fastener is generally indicated at 15 and comprises a base portion 16, an upstanding shank portion 17 and a tapering head portion 18 having diametrically opposed shoulders 18a and 18b at its juncture with shank portion 17. Shank portion 17 and head portion 18 are split by an axially extending notch 17a. The fastener also includes a plate-like member 19 having a perforation 19a therein of a diameter to just nicely receive shank portion 17.

In FIG. 7, the fastener 15 is illustrated as joining together the ends 2a and 2b of the collar 2. The ends 2a and 2b are lapped with one of the perforations 6 of end 2a in alignment with one of the perforations 7 of collar end 2b. The base portion 16 of fastener 15 is of such size as to be greater than the diameter of perforations 6 and 7. The shank 17 is of a diameter such as to be just nicely accommodated in the perforations 6 and 7. The lower part of head portion 18, forming shoulders 18a and 18b, has a greater transverse dimension than the diameter of perforations 6 and 7 and the diameter of perforation 19a of member 19.

The fastener 15 is mounted by inserting head portion 18 into the perforation 7 of collar end 2b. As the head portion 18 is shoved into perforation 7, its tapered configuration will cause its two parts formed by notch 17a to shift toward each other so that shoulder portions 18a and 18b will pass through the perforation 7, and thereafter the perforation 6. Once the shoulder portions 18a and 18b have cleared the end 2a of collar 2, the plate-like member 19 may be applied by locating perforations 19a over head portion 18 and shoving downwardly to cause head portion 18 to pass through perforation 19a, whereupon head portion 18 and shank portion 17 will return to their normal condition and base portion 16 and shoulders 18a and 18b (engaging member 19) will assure that the fastener will remain in place, joining the collar ends 2a and 2b. To remove the fastener 15, it is only necessary to manually squeeze together the two parts of head portion 18 and shove downwardly (as viewed in FIG. 7) so that the head portion 18 and its shoulders 18a and 18b will pass through the perforations 19a, 6 and 7. While the fastener 15 may be made of resilient metal or the like, it lends itself well to be molded of a tough, resilient plastic material.

FIG. 8 illustrates a fastening means similar to that of FIG. 7, but adapted to pass through two pairs of perforations in the elements of the restraint unit being joined. To this end, the fastener (generally indicated at 20) has a base portion 21, a pair of parallel, spaced shank portions 22 and 23, terminating in head portions 24 and 25. Each of the head portions 24 and 25 and their respective shaft portions 22 and 23 are split by an axially extending notch. Such notches are shown at 22a and 23a. Thus, the shank portions 22 and 23 are equivalent to shank portion 17 of FIG. 7 and the head portions 24 and 25 are substantially identical to head portion 18 of FIG. 7. The notches 22a and 23a are equivalent to and serve the same purpose as notch 17a of FIG. 7. The fastener includes a plate-like member 26 similar to plate-like member 19 of FIG. 7 but having two perforations 27 and 27a for head portions 24 and 25. The fastener of FIG. 8 operates in the same manner described with respect to the fastener of FIG. 7, differing only in that it is the equivalent of two fasteners of the type shown in FIG. 7.

From the above description it will be evident that to fasten the collar 2 or the waistband 3 about the animal, two fasteners of the type shown at 15 in FIG. 7 will be required for each element. On the other hand, the collar 2 or waistband 3 may be joined together by a single fastener of the type shown at 20 in FIG. 8. The joining of lateral pieces 4 and 5 to collar 2 and waistband 3 requires fasteners of the type shown at 15 in FIG. 7 since these attachments must be pivotal in nature.

The operation of the restraint unit thus far described can best be understood from FIGS. 1 and 2. As indicated above, the restraint unit is adapted to be fully adjustable so as to fit snugly, but comfortably on the animal. Since the attachments of lateral pieces 4 and 5 to collar 2 and waistband 3 are pivotal in nature, the animal is free to stand, sit or lie down. Furthermore, in both sitting and or standing positions, the animal is free to raise or lower its head. Thus, sleeping, eating or other normal functions are not inhibited by the restraint unit 1.

Referring in particular to FIG. 2, it will be evident that if the animal desires to lick, bite or chew the left side of the posterior portion of its body, it will be necessary for it to turn its head to the left and twist its spine to the left. This is precluded by the action of the right hand lateral piece 4 which is of such length between collar 2 and waistband 15 as to prevent such movement by the animal. Such movement would require stretching of lateral piece 4 and compression or bowing of lateral piece 5. The lateral pieces 4 and 5 are made of a material selected to be substantially unstretchable and incompressible. The restraint operates in the same manner to preclude scratching or pawing of an anterior portion of the animal's body by its left rear leg. Once again, this is precluded by lateral piece 4.

Lateral piece 5 will function in an identical manner to preclude licking, pawing or chewing of a right side posterior portion of its body by the animal or scratching or pawing of an anterior portion of its body by its right rear leg. In this way, posterior and anterior portions of the animal's body are protected from traumatization by licking, pawing, biting or scratching. Thus, stitches, bandages or medicaments will remain substantially undisturbed to permit normal healing procedures to take place. At the same time, the restraint unit 1 is lightweight, compact and far more comfortable for the animal than prior art structures.

While the invention is not intended to be limited with respect to the size of the individual parts of the restraint unit 1, the parts of the device lend themselves well to be made in various sizes to provide a full range of small, medium and large restraint units. Restraint units intended for use with dogs, for example, can be made up in the following manner. For small dogs, the collar 2 can be made 2 and ½ inches wide and in two lengths of 13 and 16 inches. For medium size dogs, the collar 2 can be made of a 3 and ½ inch width in two lengths of 19 and 22 inches. For large dogs, the collar 2 can be made of a width of 3 and ½ inches and in two lengths of 25 and 28 inches. Excellent results have been achieved with a collar 2 wherein the perforations 6 were spaced from each other by a distance of about ¾ of an inch. The perforations 7 of each pair thereof were spaced from each other by a similar distance. The pairs of perforations 7 were spaced from each other by a distance of about 1 inch.

In similar fashion, the waistband can be provided in small, medium and large sizes. When used for dogs, these sizes can be as follows. For small dogs, the waistband can have a width of 2 and ½ inches and be provided in two lengths of 25 and 28 inches, respectively. For medium sized dogs, the waistband can be provided having a width of 2 and ½ inches and in two lengths of 31 and 34 inches. Finally, for a large dog, the waistband can be provided with a width of 2 and ½ inches and in two length of 37 and 40 inches. The spacing of the holes 10 at the end 3a of waistband 3 can be the same as that described with respect to the perforations 6 of the end 2a of collar 2. The spacing of the perforations 11 of each pair thereof and the spacing of the pairs of perforations 11 from each other can be the same as described with respect the pairs of perforations 7 of collar 2.

In the exemplary ranges of small, medium and large for dogs given above, the lateral pieces 4 and 5 may be identical and may be provided in three lengths of 4 and ½, 8 and 14 inches. Complete adjustability is achieved in instances where the perforations 14 of the lateral piece are spaced from each other along the lateral piece a distance of about 1 inch.

Lateral pieces of additional length dimensions can be provided by simply combining two or more lateral pieces of the same or different lengths. In FIG. 9, a lateral piece 4 is shown combined with a second lateral piece 4a. The lateral pieces 4 and 4a may be of any of the length dimensions taught above. To join the pieces 4 and 4a it is only necessary to lap their ends so that at least two perforations of each piece are coaxial. The pieces 4 and 4a may then be joined by two of the fastening means 15 of FIG. 7 or one of the fastening means 20 of FIG. 8. Since at least two perforations of each piece are engaged by fastening means, the joined lateral pieces will retain a rectilinear configuration, the juncture of the pieces being non-pivotal.

Under certain circumstances, it is desirable to prevent the lowering of the animal's head and to maintain the head in an elevated position. This is true, for example, after certain forms of opthalmic surgery. FIG. 10 illustrates one embodiment of mandible engaging attachment for use with the restraint unit 1 of the present invention to maintain the animal's head in elevated position. Once again, the restraint unit comprises a collar 2, a waistband 3 and lateral pieces 4 and 5 (lateral piece 5 not being visible in FIG. 10). The lateral pieces 4 and 5, in this instance, are selected to have a length such that, upon appropriate attachment to the collar 2 and waistband 3, they will have free ends extending beneath the animal's lower jaw. To these free ends of lateral pieces 4 and 5 there is attached a U-shaped element 28. The free ends of U-shaped element 28 are provided with pairs of perforations which align with the first two perforations at the free ends of lateral pieces 4 and 5. In this way, the U-shaped element 28 can be joined to the free ends of lateral pieces 4 and 5 through the use of pairs of fastening means 15 (FIG. 7) or the use of fastening means 20 (FIG. 8). The extra length lateral pieces 4 and 5, in combination with U-shaped element 28 serve to restrict the lowering of the animal's head.

FIG. 11 illustrates another form of mandible engaging attachment to restrict lowering of the animal's head. The embodiment of FIG. 11 is identical to that of FIG. 10 with the exception that the free ends of extra length lateral pieces 4 and 5 have pivotally attached thereto a U-shaped member 29. The U-shaped member 29 differs from the U-shaped element 28 of FIG. 10 in that its free ends are provided with single perforations intended to be pivotally joined to the forwardmost perforations of the free ends of extra length lateral pieces 4 and 5 by fastening means 15 (see FIG. 7).

Yet another embodiment of mandible engaging attachment is illustrated in FIG. 12. In this embodiment, the restraint unit 1 is made up of a collar 2, a waistband 3 and lateral pieces 4 and 5, identical to the embodiment illustrated in FIGS. 1, 2 and 3. In this embodiment, a pliable strap-like element 30 bent into a U-shape is provided, having a pair of perforations at both of its ends. In FIG. 12, the pair of perforations of one end of element 30 are shown at 31 and 32. It will be evident that perforations 31 and 32 are in alignment with the first two perforations of the forward end of lateral piece 4. The perforation 32 is also in alignment with an appropriate one of the diametrically opposed perforations in collar 2. Thus, a fastening means of the type shown in FIG. 7 may be used to extend through the second perforation of lateral piece 4 and perforation 31 of U-shaped element 30. A similar but slightly longer fastening means will pass through the collar perforation, the forwardmost perforation of lateral piece 4 and the perforation 32 of U-shaped element 30. The other free end of U-shaped element 30 will be similarly joined to the restraint unit on the other side of the animal and it will be immediately evident that the U-shaped element 30 will constitute a rigid continuation of lateral piece 4 and lateral piece 5 (not shown).

FIG. 12 also illustrates a thoracic attachment for the restraint unit 1. The thoracic attachment constitutes a pliable strap-like element 33 bent into a U-shaped configuration. The free end of element 33 (shown in FIG. 12) is affixed to a selected one of the perforations 14 in lateral strap 4 by means of a fastening means such as that shown in FIG. 7 at 15. It will be understood that the other free end of element 33 is similarly attached to lateral piece 5 (not shown). To prevent pivotal movement of element 33 with respect to lateral pieces 4 and 5, additional strap-like members are used. One such member is shown at 34 in FIG. 12. The member 34 is similar in construction to lateral piece 4 and is provided with a series of perforations 35 spaced along its length. The element 34 is attached to the lateral piece 4 by means of a fastener 15 extending through a selected one of the perforations 35 in element 34 and a selected one of perforations 14 in lateral piece 4. The element 34 is also attached by a fastening means 15 to element 33 by means of a fastener 15 extending through a selected one of a plurality of perforations 36 extending along element 33 and a selected one of the perforations 35 of element 34. An element identical to element 34 is similarly attached to the other leg of element 33 and to lateral piece 5 (not shown) so that the element 33 will be substantially rigid with respect to the restraint unit. It will be understood that the element 33 will prevent the animal from raising his front paws to paw or scratch about the head area thereby preventing injury thereto. This is particularly important after ophthalmic surgery or the like.

It will be evident to one skilled in the art that the restraint unit of the present invention can also be employed in the training of an animal. The restraint unit will tend to restrict the actions of an unruly animal and the thoracic attachment 33 can be used to prevent jumping, jumping over fences or the like.

Modification may be made in the invention without departing from the spirit of it.

What is claimed is:

1. An animal restraint unit of the type to be worn by the animal, said restraint unit comprising an adjustable collar mountable about the animal's neck, an adjustable waistband mountable about the animal's body just behind the rib cage and a pair of elongated, rectilinear, lateral pieces, said lateral pieces being pivotally and releasably connected at substantially diametric positions to said collar and to said waistband and extending therebetween along the animal's sides, said connections of said lateral pieces to said collar and to said waistband being adjustable to properly fit the animal, these portions of said lateral pieces extending between said collar and said waistband being of such length that said restraint unit prohibits the animal from twisting his body laterally for purposes of licking, biting or gnawing posterior portions thereof or for purposes of pawing or scratching anterior portions thereof with his hind paws.

2. The structure claimed in claim 1 wherein said lateral pieces have free ends extending forwardly of said collar to a position adjacent said animal's lower jaw, a U-shaped member joining said free ends of said lateral pieces, said U-shaped member having a base portion and a pair of legs, each of said legs being parallel to and rigidly affixed to said free ends of said lateral pieces, said base portion of said U-shaped member underlying and supporting the animal's lower jaw to prevent lowering of the animal's head.

3. The structure claimed in claim 1 wherein said lateral pieces have free ends extending forwardly of said collar to a position adjacent said animal's lower jaw, a U-shaped member having a base portion and a pair of legs, each of said legs of said U-shaped member being pivotally attached to said free end of one of said lateral pieces, said U-shaped member depending downwardly from said free ends of said lateral pieces with said base portion thereof supporting the animal's lower jaw to prevent lowering of the animal's head.

4. The structure claimed in claim 1 including a U-shaped member having a pair of legs and a base portion, said U-shaped member being rigidly affixed to at least one of said collar and said lateral pieces with said legs thereof located to either side of said collar and being parallel to and constituting extensions of said lateral pieces, said base portion of said U-shaped member underlying and supporting the animal's lower jaw to prevent lowering of the animal's head.

5. The structure claimed in claim 1 including a thoracic attachment comprising a U-shaped member having a pair of legs joined together by a base portion, said legs of said U-shaped member having free ends each attached to one of said lateral pieces near said waistband, a pair of strap-like elements, each strap-like element having one end affixed to one of said lateral pieces and extending downwardly with its other end affixed to the adjacent one of said legs of said thoracic attachment, said thoracic attachment and said strap-like element thereof being so sized that said base portion of said thoracic attachment extends forwardly of and across the animal's chest to prevent the animal from jumping and from pawing or scratching the head area with his front paws.

6. The structure claimed in claim 1 including releasable fastening means adapted to pass through pairs of coaxial perforations in the ends of said collar and in the ends of said waistband to fasten said collar and waistband about said animal and through pairs of coaxial perforations in said lateral pieces and said collar and waistband to join said lateral pieces to said collar and waistband, each of said fastening means comprising a base portion and at least one upstanding shank formed on said base portion and terminating in an enlarged head defining a pair of diametrically opposed shoulders at the juncture of said shank and said head, said head and shank having a longitudinal slot formed therein, a plate-like member having a perforation therein so sized as to permit the passage of said enlarged head therethrough with a snap fit, said fastener extending through one of said pairs of coaxial perforations with said base at one end of said coaxial perforations and said plate-like member at the end of said coaxial perforations said plate-like member being engaged by said shoulders.

* * * * *

UNITED STATES PATENT AND TRADEMARK OFFICE
CERTIFICATE OF CORRECTION

PATENT NO. : 4,286,547

DATED : September 1, 1981

INVENTOR(S) : Robert E. Neubauer and Gunther B. Niemann

It is certified that error appears in the above-identified patent and that said Letters Patent are hereby corrected as shown below:

On the title page, in the second line the inventors are listed as Newbauer et al. It should read:

Neubauer et al.

Signed and Sealed this

Ninth Day of February 1982

[SEAL]

Attest:

Attesting Officer

GERALD J. MOSSINGHOFF

Commissioner of Patents and Trademarks